United States Patent
Liu et al.

(10) Patent No.: US 10,089,786 B2
(45) Date of Patent: Oct. 2, 2018

(54) AUTOMATIC CUSTOMIZATION OF GRAPHICAL USER INTERFACE FOR OPTICAL SEE-THROUGH HEAD MOUNTED DISPLAY WITH USER INTERACTION TRACKING

(71) Applicant: QUALCOMM Incorporated, San Diego, CA (US)

(72) Inventors: Kexi Liu, San Diego, CA (US); Md Sazzadur Rahman, San Diego, CA (US); Martin H. Renschler, San Diego, CA (US); Babak Forutanpour, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 78 days.

(21) Appl. No.: 14/151,620

(22) Filed: Jan. 9, 2014

(65) Prior Publication Data

US 2015/0049112 A1 Feb. 19, 2015

Related U.S. Application Data

(60) Provisional application No. 61/867,516, filed on Aug. 19, 2013.

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01); *G06F 3/013* (2013.01); *G06F 3/04842* (2013.01)

(58) Field of Classification Search
CPC .... G06F 3/011; G06F 3/04842; G06F 3/0482; G06F 3/013; G06T 19/006; G02B 27/017
(Continued)

(56) References Cited

U.S. PATENT DOCUMENTS 5,565,888 A * 10/1996 Selker ................. G06F 3/04842
345/157
8,483,768 B2 * 7/2013 Kim ........................ G06F 3/041
345/594

(Continued)

FOREIGN PATENT DOCUMENTS

EP 1679577 A1 7/2006

OTHER PUBLICATIONS

International Search Report and Written Opinion—PCT/US2014/051109—ISA/EPO—Nov. 13, 2014.

*Primary Examiner* — Chante Harrison
(74) *Attorney, Agent, or Firm* — Arent Fox, LLP and Qualcomm, Incorporated

(57) ABSTRACT

A method, an apparatus, and a computer program product render a graphical user interface (GUI) on an optical see-through head mounted display (HMD). The apparatus obtains a location on the HMD corresponding to a user interaction with a GUI object displayed on the HMD. The GUI object may be an icon on the HMD and the user interaction may be an attempt by the user to select the icon through an eye gaze or gesture. The apparatus determines whether a spatial relationship between the location of user interaction and the GUI object satisfies a criterion, and adjusts a parameter of the GUI object when the criterion is not satisfied. The parameter may be one or more of a size of the GUI object, a size of a boundary associated with the GUI object or a location of the GUI object.

55 Claims, 9 Drawing Sheets

(51) Int. Cl.
*G06F 3/0482* (2013.01)
*G06F 3/0484* (2013.01)
*G02B 27/01* (2006.01)

(58) Field of Classification Search
USPC ....... 345/173, 178, 156, 619, 179, 7, 8, 418, 345/629, 633, 660–661; 715/862, 863, 715/700, 767, 821–823, 860, 812, 858
See application file for complete search history.

(56) References Cited

U.S. PATENT DOCUMENTS

| | | | |
|---|---|---|---|
| 2002/0171675 A1* | 11/2002 | Fox | G06Q 99/00 715/700 |
| 2002/0171690 A1* | 11/2002 | Fox et al. | 345/862 |
| 2005/0047629 A1* | 3/2005 | Farrell | G06F 3/013 382/117 |
| 2005/0243054 A1 | 11/2005 | Beymer et al. | |
| 2009/0289914 A1* | 11/2009 | Cho | G06F 3/044 345/173 |
| 2010/0090964 A1* | 4/2010 | Soo et al. | 345/173 |
| 2011/0074918 A1* | 3/2011 | Klappert | H04N 13/004 348/43 |
| 2011/0161878 A1* | 6/2011 | Stallings | G06F 3/0482 715/811 |
| 2012/0154311 A1* | 6/2012 | Iijima et al. | 345/173 |
| 2013/0050258 A1 | 2/2013 | Liu et al. | |
| 2013/0063340 A1 | 3/2013 | Mondragon et al. | |
| 2013/0120278 A1 | 5/2013 | Cantrell | |
| 2013/0181930 A1* | 7/2013 | Lmada et al. | 345/173 |
| 2013/0321265 A1* | 12/2013 | Bychkov et al. | 345/156 |
| 2013/0335303 A1* | 12/2013 | Maciocci | G02B 27/017 345/8 |
| 2014/0104143 A1* | 4/2014 | Benson | G02B 27/017 345/8 |
| 2014/0129987 A1* | 5/2014 | Feit | G06F 3/04842 715/835 |
| 2014/0168075 A1* | 6/2014 | Markovic | G06F 3/017 345/156 |
| 2014/0181740 A1* | 6/2014 | Gachoka | G06F 3/04842 715/802 |
| 2014/0218370 A1* | 8/2014 | Mishra et al. | 345/473 |
| 2015/0026637 A1* | 1/2015 | Ross | 715/810 |
| 2015/0091877 A1* | 4/2015 | Kim et al. | 345/178 |
| 2015/0113483 A1* | 4/2015 | Van Der Westhuizen | G06F 3/04812 715/850 |
| 2016/0116980 A1* | 4/2016 | George-Svahn | G06F 3/013 345/173 |
| 2016/0179205 A1* | 6/2016 | Katz | G06F 3/013 345/156 |

\* cited by examiner

AUTOMATIC CUSTOMIZATION OF GRAPHICAL USER INTERFACE FOR OPTICAL SEE-THROUGH HEAD MOUNTED DISPLAY WITH USER INTERACTION TRACKING

CROSS-REFERENCE TO RELATED APPLICATION(S)

This application claims the benefit of U.S. Provisional Application Ser. No. 61/867,516, entitled "Automatic Customization of Graphical User Interface for Head Mounted Display with Eye Tracking Capability" and filed on Aug. 19, 2013, which is expressly incorporated by reference herein in its entirety.

BACKGROUND

Field

The present disclosure relates generally to augmented reality (AR) devices, e.g., AR eyeglasses, having optical see-through head mounted displays (HMD) and user interaction capability, and more particularly, to automatic customization of graphical user interfaces (GUIs) displayed on HMDs. AR is a technology in which a user's view of the real world is enhanced with additional information generated from a computer model. The enhancements may include labels, 3D rendered models, or shading and illumination changes. AR allows a user to work with and examine the physical real world, while receiving additional information about the objects in it.

Background

AR devices typically include an optical see-through HMD and one or more user input mechanisms that allow users to simultaneously see and interact with their surroundings while interacting with applications, such as e-mail and media players. User input mechanisms may include one or more of gesture recognition technology, eye tracking technology, and other similar mechanisms.

AR devices with eye tracking capability may provide for visual activation of applications and selection of files and documents, wherein activation or selection occurs when a user is looking at a displayed object corresponding to the application, file or document. In such AR devices, the displayed object, e.g., application icon, is displayed at a coordinate location of the HMD, while the location on the HMD at which a user is looking or gazing is determined using eye tracking technology. The determined eye gaze location is identified by coordinates of the HMD and may be displayed on the HMD as a point. When the eye gaze coordinates of the user are within range of the displayed object, i.e., either at or sufficiently near the coordinates of the displayed object, activation or selection of the displayed object occurs.

Effective implementation of visual activation of applications and selection of files and documents through eye tracking necessarily depends on the accuracy of the eye tracking technology. Eye tracking accuracy varies depending on environmental factors, such as light conditions, and user factors, such as eye shape and nose height. In cases where eye tracking is inaccurate, the eye gaze location or point determined by the eye tracking technology may not correspond to the location where the user is looking. Accordingly, although a user may be looking at an application icon on the HMD in an attempt to launch the application, the AR device does not recognize the attempt because the eye gaze coordinate output by the eye tracking technology is not within range of the icon.

SUMMARY

In an aspect of the disclosure, a method, an apparatus, and a computer program product render a graphical user interface (GUI) on an optical see-through head mounted display (HMD). The apparatus obtains a location on the HMD corresponding to a user interaction with a GUI object displayed on the HMD. The GUI object may be an icon on the HMD and the user interaction may be an attempt by the user to select the icon through an eye gaze or gesture. The apparatus determines whether a spatial relationship between the location of user interaction and the GUI object satisfies a criterion, and adjusts a parameter of the GUI object when the criterion is not satisfied. The parameter may be one or more of a size of the GUI object, a size of a boundary associated with the GUI object, and a location of the GUI object.

DETAILED DESCRIPTION

Figure 1:
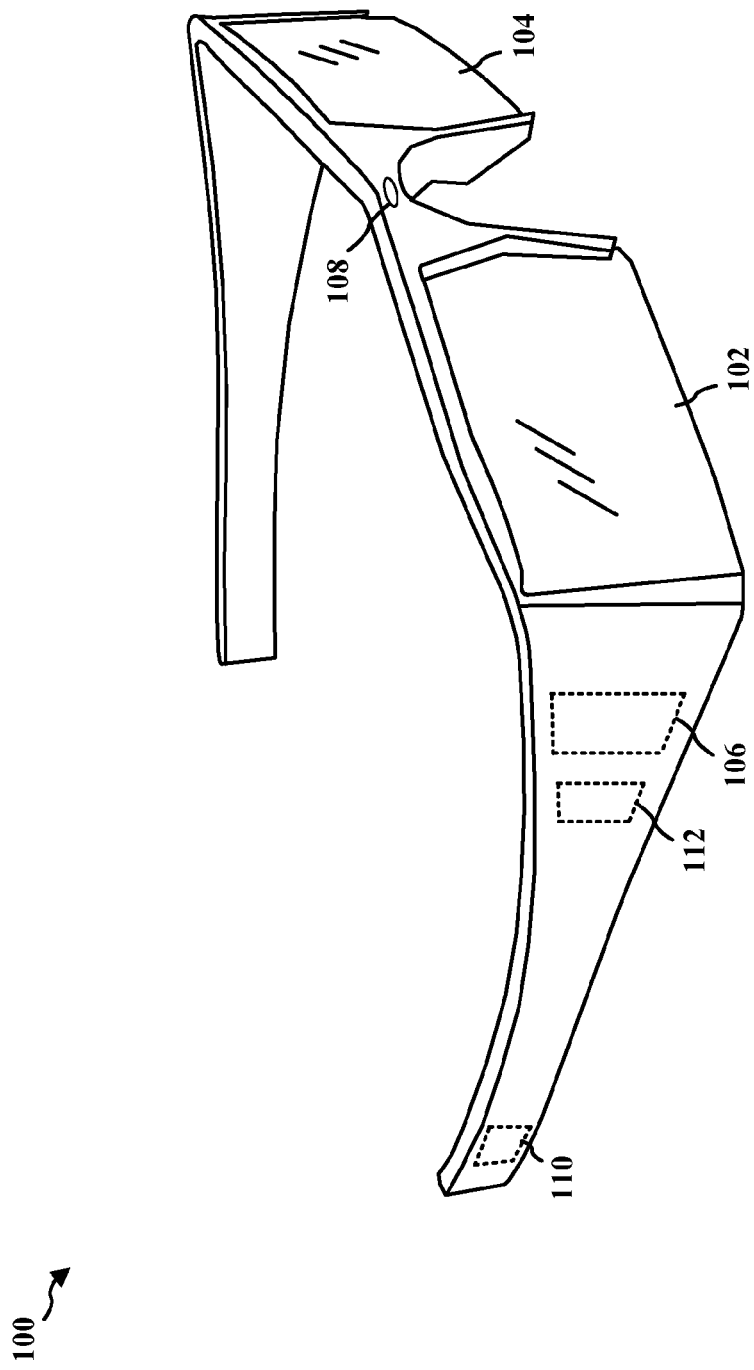
FIG. 1 is an illustration of an AR device in the form of a pair of eyeglasses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of automatic customization of graphical user interfaces (GUIs) displayed on an optical see-through head mounted display (HMD) of an augmented reality (AR) device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is an illustration of an example AR device 100 in the form of a pair of eyeglasses. The AR device 100 is configured such that the user of the device is able to view real-world scenes through optical see-through HMDs together with content displayed on the HMDs, including both two-dimensional (2D) and three-dimensional (3D) AR content. The AR device 100 may also be configured to allow the user to interact with the content and possibly with remote devices, systems or networks through wireless communication. The AR device may also provide feedback to the user as a result of such interactions, including for example, audio, video or tactile feedback. To these ends, the example AR device 100 includes a pair of optical see-through HMDs 102, 104, an on-board processing system 106, one or more sensors, such as a scene camera 108, one or more eye tracking components (not visible) for each of the right eye and left eye, one or more user-interaction feedback devices 110 and a transceiver 112.

The processing system 106 and the eye tracking components provide eye tracking capability. Depending on the eye tracking technology being employed, eye tracking components may include one or both of eye cameras and infra-red emitters, e.g. diodes. The processing system 106 and the scene camera 108 provide gesture tracking capability.

The feedback devices 110 provide perception feedback to the user in response to certain interactions with the AR device. Feedback devices 110 may include a speaker or a vibration device. Perception feedback may also be provided by visual indication through the HMD.

The transceiver 112 facilitates wireless communication between the processing system 106 and remote devices, systems or networks. For example, the AR device may communicate with remote servers through the transceiver 112 for purposes of remote processing, such as on-line searches through remote search engines.

Figure 2:
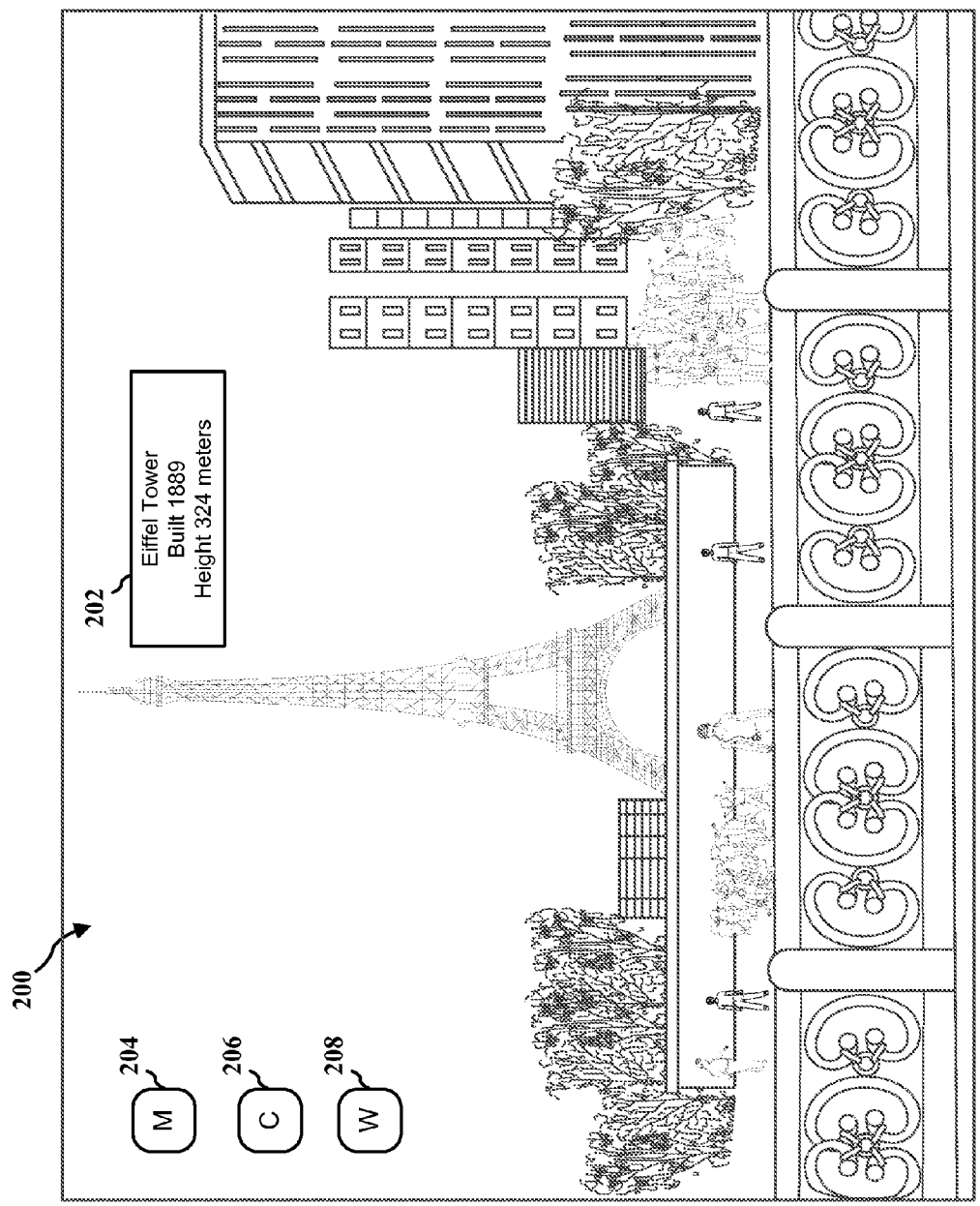
FIG. 2 is an illustration of a real-world scene through an optical see-through HMD with augmented reality.

As mention above, the AR device 100 allows a user to view real-world scenes through optical see-through HMDs together with content displayed on the HMDs. For example, with reference to FIG. 2, as a user is viewing a real-world scene 200 through the optical see-through HMDs 102, 104, the scene camera 108 may capture an image of the scene and send the image to the on-board processing system 106. The processing system 106 may process the image and output AR content 202 for display on the HMDs 102, 104. The content 202 may provide information describing what the user is seeing. In some cases, the processing system 106 may transmit the image through the transceiver 112 to a remote processor (not shown) for processing. The processing system 106 may also display one or more application icons 204, 206, 208 on the HMDs 102, 104 and output application content, such as e-mails, documents, web pages, or media content such as video games, movies or electronic books, in response to user interaction with the icons.

User interaction with the AR device 100 is provided by one or more user input mechanisms, such as a gesture tracking module or an eye-gaze tracking module. Gesture tracking is provided by the scene camera 108 in conjunction with a gesture tracking module of the processing system 106. With gesture tracking, a user may attempt to activate an application by placing his finger on an application icon 204, 206, 208 in the field of view of the AR device. The scene camera 108 captures an image of the finger and sends the image to the gesture tracking module. The gesture tracking module processes the image and determines coordinates of a gesture point corresponding to where the user is pointing. The processing system 106 compares the coordinate location of the gesture point to the coordinate location of the icon on the display. If the locations match, or are within a threshold distance of each other, the processing system 106 determines that the user has selected the icon 204, 206, 208 and accordingly, launches the application.

Eye-gaze tracking is provided by the eye tracking components (not visible) in conjunction with an eye tracking module of the processing system 106. A user may attempt to activate an application by gazing at an application icon 204, 206, 208 in the field of view of the AR device. The eye tracking components capture images of the eyes, and provide the images to the eye tracking module. The eye tracking module processes the images and determines coordinates of an eye-gaze point corresponding to where the user is looking. The processing system 106 compares the coordinate location of the eye-gaze point to the coordinate location of the icon on the display. If the locations match, or are within a threshold distance of each other, the processing system 106 determines that the user has selected the icon 204, 206, 208 and accordingly, launches the application. Often, such eye-gaze based launching is coupled with another form of input to confirm the user's intention of launching the application. For example, the user may make a gesture with his hand, such as a finger snap, or tapping a leg, or push a button, to confirm his intention. The gesture may be detected by another device linked to the AR device, such as a wristband. The push button may be associated with the wristband or another device worn by the user, such as a ring.

Figure 3:
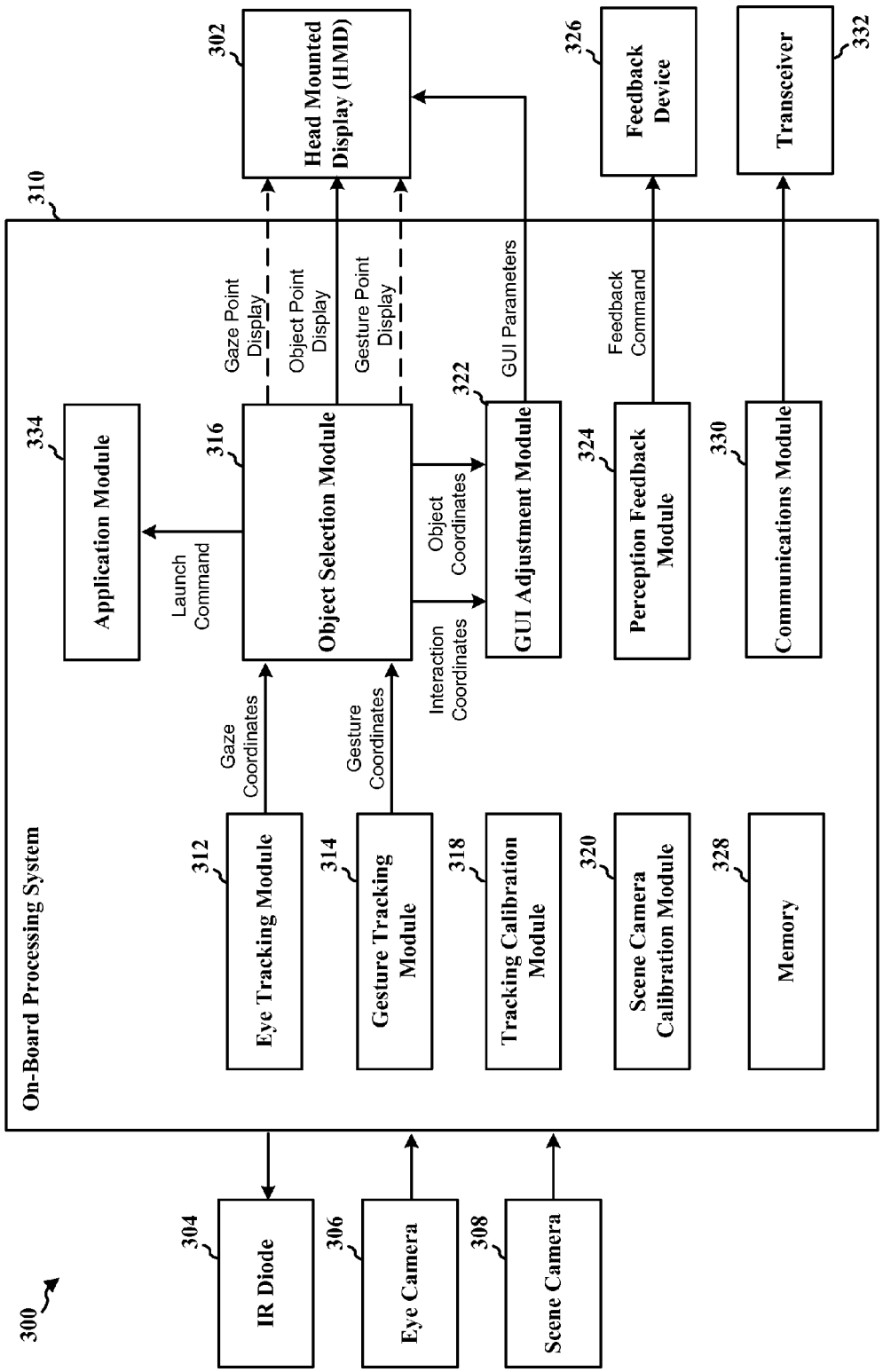
FIG. 3 is a diagram illustrating elements of an AR device.

FIG. 3 is a diagram illustrating elements of an example AR device 300 with optical see-through HMDs 302. The AR device 300 may include one or more sensing devices, such as infrared (IR) diodes 304 facing toward the wearer of the AR device and eye cameras 306 facing toward the wearer. A scene camera 308 facing away from the wearer captures images of the field of view seen by the user through the HMD 302. The cameras 306, 308 may be video cameras. While only one IR diode 304 and one eye camera 306 are illustrated, the AR device 300 typically includes several diodes and cameras for each of the left eye and right eye. A single scene camera 308 is usually sufficient. For ease of illustration only one of each sensor type is shown in FIG. 3.

The AR device 300 includes an on-board processing system 310, which in turn includes one or more of an eye tracking module 312 and a gesture tracking module 314. As described further below, an object selection module 316 processes the outputs of the one or more tracking modules to determine user interactions and tracking module accuracy. A tracking calibration module 318 calibrates the one or more tracking modules if the tracking module is determined to be inaccurate.

The on-board processing system 310 may also include a scene camera calibration module 320, a graphical user interface (GUI) adjustment module 322, and a perception feedback module 324. The scene camera calibration module 320 calibrates the AR device so that the AR content is aligned with real world objects. The GUI adjustment module 322 may adjust the parameters of GUI objects displayed on the HMD to compensate for eye-tracking or gesture-tracking inaccuracies detected by the object selection module 316. Such adjustments may precede, supplement, or substitute for the actions of the tracking calibration module 318. The feedback module 324 controls one or more feedback devices 326 to provide perception feedback to the user in response to one or more types of user interactions. For example, the feedback module may command a feedback device 326 to output sound when a user selects an icon in the field of view using a gesture or eye gaze.

The AR device 300 further includes memory 328 for storing program code to implement the foregoing features of the on-board processing system 310. A communications module 330 and transceiver 332 facilitate wireless communications with remote devices, systems and networks. For example, in one implementation, an image of a real-world object may be captured by the scene camera 308 and transmitted by the communications module 330 and the transceiver 332 to a remote search engine, with subsequent search results being received by the transceiver.

With further respect to eye tracking capability, the diodes 304 and eye cameras 306, together with the eye tracking module 312, provide eye tracking capability as generally described above. In the example implementation of FIG. 3, the eye tracking capability is based on known infrared technology. One such known technology uses infrared light emitting diodes and infrared sensitive video camera for remotely recording images of the eye. Infrared light output by the diode 304 enters the eye and is absorbed and re-emitted by the retina, thereby causing a "bright eye effect" that makes the pupil brighter than the rest of the eye. The infrared light also gives rise to an even brighter small glint that is formed on the surface of the cornea. The eye tracking module 312 acquires a video image of the eye from the eye camera 306, digitizes it into a matrix of pixels, and then analyzes the matrix to identify the location of the pupil's center relative to the glint's center, as well as a vector between these centers. Based on the determined vector, the eye tracking module 312 outputs eye gaze coordinates defining an eye gaze point (E).

The scene camera 308, together with the gesture tracking module 314, provide gesture tracking capability using a known technology as generally described above. In the example implementation of FIG. 3, the gesture tracking capability is based on gesture images captured by the scene camera 308. The gesture images are processed by the gesture tracking module 314 by comparing captured images to a catalog of images to determine if there is a match. For example, the user may be pointing at an icon in the field of view. The gesture tracking module 312 may detect a match between the gesture image and a cataloged image of pointing and thereby recognize the gesture as pointing. Upon detection of a recognized gesture, the gesture tracking module 314 processes the captured image further to determine the coordinates of a relevant part of the gesture image. In the case of finger pointing, the relevant part of the image may correspond to the tip of the finger. The gesture tracking module 314 outputs gesture coordinates defining a gesture point (G).

The object selection processor 316 functions to determine whether interactions of the user, as characterized by one or more of the eye tracking module 312 and the gesture tracking module 314, correspond to a selection of an object, e.g., application icon, displayed on the HMD 302 and visible in the field of view. If an interaction does correspond to a selection by the user, for example, a selection of an icon to launch an application 334, the object selection processor 316 outputs a command to the application.

With respect to object selection based on eye gaze, the object selection processor 316 receives eye gaze coordinates representing an eye gaze point (E) from the eye tracking module 312. In one configuration, the eye gaze coordinates output by the eye tracking module 312 are with respect to the origin and direction of an eye coordinate system. The eye coordinate system is defined by the eye tracking module 312 and usually has an origin corresponding to the center of the user's respective right or left eye. In this configuration, the object selection processor 316 transforms the eye gaze coordinates to a screen coordinate system, and optionally outputs the transformed eye gaze coordinates as an eye gaze point (E) for display on the HMD. The screen coordinate system is defined by the HMD and usually has an origin corresponding to the center of the respective right or left HMD. In another configuration, the transformation of the eye gaze coordinate to the screen coordinate system of the HMD may be performed by the eye tracking module 306.

The object selection processor 316 compares the eye gaze coordinates of eye gaze point (E) to the object coordinates of an object point (P), for example, by determining the distance between the point (E) and point (P). The object point (P) may correspond to the center of an application icon displayed on the HMD. If the eye gaze point (E) is determined to be at or near the object point (P), then the object selection processor 316 determines that a selection has occurred, and an appropriate action follows. For example, if the object point (P) represents and application icon, the command may open the application.

With respect to object selection based on gesture, the object selection processor 316 receives gesture coordinates representing a gesture point (G) from the gesture tracking module 314. In one configuration, the gesture coordinates output by the gesture tracking module 314 are with respect to the origin and direction of gesture coordinate system. The gesture coordinate system is defined by the gesture tracking module 314 and usually has an origin corresponding to the center of the scene camera 308. In this configuration, the object selection processor 316 transforms the gesture coordinates to a screen coordinate system, and optionally outputs the transformed gesture coordinates as gesture point (G) for display on the HMD. The screen coordinate system is defined by the HMD and usually has an origin corresponding to the center of the respective right or left HMD. In another configuration, the transformation of the gesture coordinate to the screen coordinate system of the HMD may be performed by the gesture tracking module 314.

The object selection processor 316 compares the gesture coordinates of gesture point (G) to the object coordinates of an object point (P), for example, by determining the distance between the point (G) and point (P). The object point (P) may correspond to the center of an application icon displayed on the HMD. If the gesture point (G) is determined to be at or near the object point (P), then the object selection processor 316 determines that a selection has occurred, and an appropriate action follows. For example, if the object point (P) represents an application icon, the command may open the application.

As mentioned above, the accuracy of eye tracking technology varies depending on environmental factors, such as light conditions, and user factors, such as eye shape and nose height. Inaccurate eye tracking may result in poor user experience in that a user's attempt to activate an application may go undetected by the processing system 106.

Figure 4:
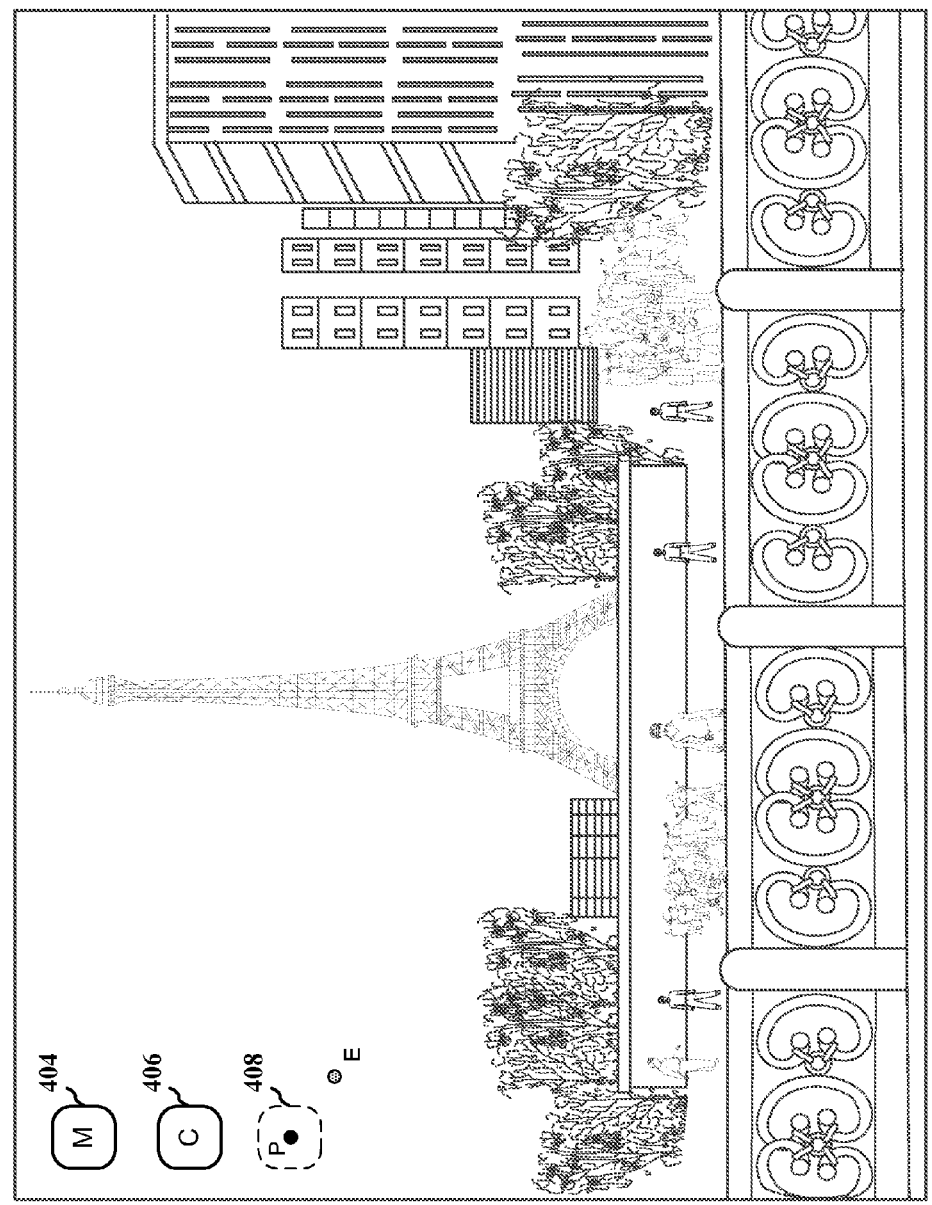
FIG. 4 is an illustration of an HMD scene with inaccurate eye tracking, wherein a reported eye-gaze coordinate is offset from a user's actual gaze.

FIG. 4 is an illustration of an instance of inaccurate eye tracking. Here, the user is attempting to activate the application associated with an icon 408 by staring at the icon. The eye tracking module 310, however, outputs an eye-gaze point (E) having a location that does not match, nor fall within a threshold distance of, the object point (P) representing the icon 408. Because the user's eye gaze is not touching or sufficiently close to the icon, the AR device does not recognize the user's intent and the application or document is not activated or selected by the device. To address this issue, the eye tracking module 310 may be calibrated so that the output of the eye tracking module allows the object selection processor 314 to accurately determine whether a user is selecting an object on the HMD screen.

Figure 5:
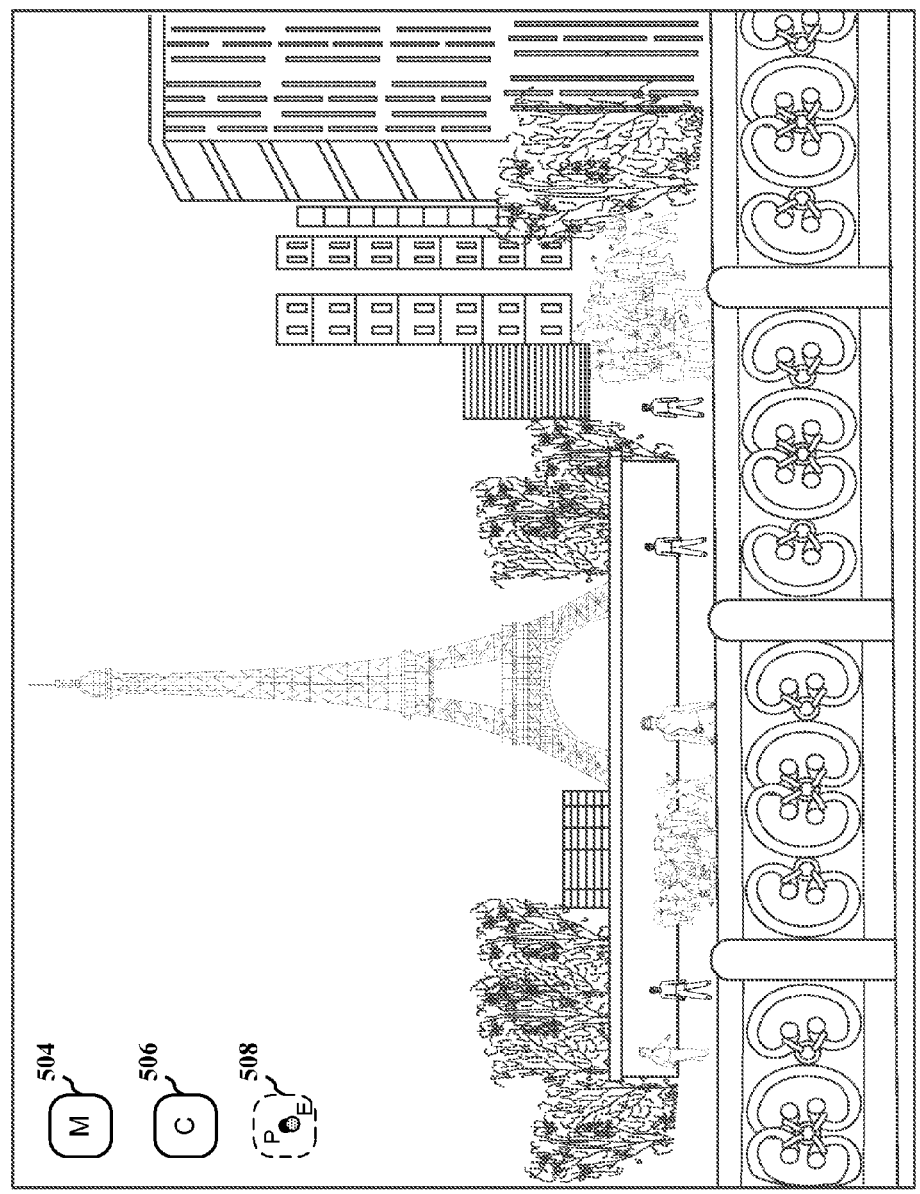
FIG. 5 is an illustration of an HMD scene with accurate eye tracking, wherein a reported eye-gaze coordinate is sufficiently aligned with a user's actual gaze.

FIG. 5 is an illustration of an instance of accurate eye tracking after calibration. During a typical calibration phase, a user is presented at least one virtual target dot (T) in the optical see-through HMD display. The user then stares into the dot (T) and initiates eye tracking calibration using some input technique, such as a gesture. The eye tracking module generates a user eye-gaze point (E) based on its model. Using coordinates of the target dot (T) and coordinates of the eye-gaze point (E), the eye tracking module adjusts its output model such that the target dot (T) and eye-gaze point (E) overlap, as shown in FIG. 5. After calibration, the AR device displays a dot corresponding to the calibrated eye-gaze point (E) along with the target dot (P) the user is looking at. This helps the user to visually determine the accuracy of the calibration process and to determine whether the accuracy acceptable. If the accuracy is not acceptable, the user may repeat the calibration process.

Prior to calibration, or even after calibration if such calibration is not entirely successful, it would be beneficial to provide for improved user interaction with GUI objects displayed on the HMD. Such improvement may be provided, for example, by automatic and customized rendering or re-rendering of GUI objects. In the case where the AR device determines poor eye-tracking accuracy is causing the device to not detect user interactions with a GUI object, parameters of the GUI object may be adjusted to compensate for the inaccuracy. For example, the size of the GUI object may be increased so that previously undetected interactions become detected. The AR device may also adjust GUI object parameters upon determining eye-tracking accuracy is above average. In this case, if a user's eye gaze is determined to be very close to or at an object point, e.g., center, of the GUI object, the AR device may adjust the GUI object parameters so the object is rendered smaller in size. This is beneficial in that it reduces the amount of HMD screen consumed by GUI objects.

Figure 6:
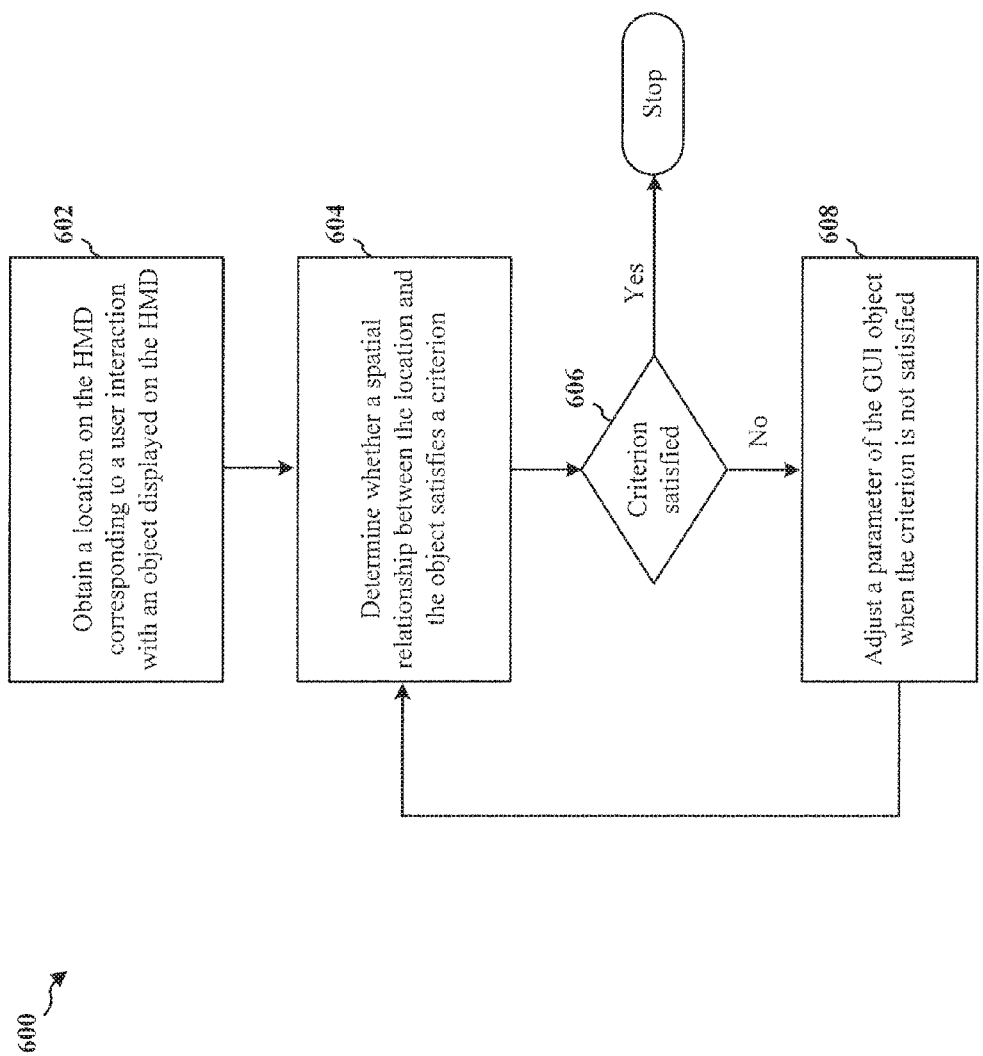
FIG. 6 is a flow chart of a method of rendering a graphical user interface (GUI) on an optical see-through HMD.

FIG. 6 is a flowchart of a method of automatic and customized rendering of a GUI on an optical see-through HMD. The method may be performed by an AR device. In step 602, the AR device obtains a location on the HMD corresponding to a user interaction with a GUI object displayed on the HMD. The GUI object displayed on the HMD may be an icon. In one configuration, the user interaction may be an eye gaze, in which case the AR device obtains a location on the HMD by obtaining data corresponding to the location from an eye tracking system that tracks user eye gaze. The eye tracking system may be the eye tracking module 312 and the data corresponding to the location may be coordinates of the HMD screen. In another configuration, the user interaction may be a gesture, in which case the AR device obtains a location on the HMD by obtaining data corresponding to the location from a gesture tracking system that tracks user gestures. The gesture tracking system may be the gesture tracking module 314.

At step 604, the AR device determines whether a spatial relationship between the location and the GUI object satisfies a criterion. As described above, the location may be defined by a location point on the HMD, such as coordinate points of the HMD screen.

At step 606, the AR device determines if the criterion is satisfied. The AR device determines whether the criterion is satisfied by obtaining data corresponding to an object point of the GUI object on the HMD. The object point may be, for example, a center point of the GUI object. The data corresponding to the object point may also be coordinates of the HMD screen.

Once the data for each of the location point and the object point is determined or obtained, the AR device determines a spatial relationship between the location point and the object point. In one configuration, the spatial relationship is the distance between the two points and the criterion is not satisfied when the distance is greater than a threshold. In another configuration, the AR device determines data corresponding to a boundary around the GUI object or object point. The boundary may be a geometric shape, e.g., circle, defined relative to the center of the GUI object. In this case, the criterion is not satisfied when the distance is such that the location point lies outside the boundary.

If the AR device determines that the criterion is satisfied, the process stops. If the criterion is not satisfied, then at step 608, the AR device adjusts a parameter of the GUI object. The parameter may be one or more of the size of the GUI object, the size of a boundary associated with the GUI object, and a location of the GUI object. For example, the size of the GUI may be increased so the location point lies within the boundary and user's attempted interaction with the AR device is successful. The amount by which the size of a GUI object is increased may be proportional to the distance between the location and the GUI object.

In another configuration, the criterion may be deemed not satisfied when the spatial relationship between the location and the GUI object indicates that location is directly at, or within a close distance of, the GUI object. This corresponds to highly accurate user interaction tracking. In this case, the parameters of the GUI object may be adjusted so that the size of the GUI is decreased. The amount by which the size of a GUI object is decreased may be proportional to the distance between the location and the GUI object.

In view of the foregoing, there may be a range of spatial relationships, e.g., distances between a location and GUI object, that correspond to the criterion being satisfied. Distances greater than the high end of the range correspond to inaccurate tracking and result in increased GUI object parameters, while distances less than the low end of the range correspond to highly accurate tracking and result in decreased GUI object parameters.

Figure 7B:
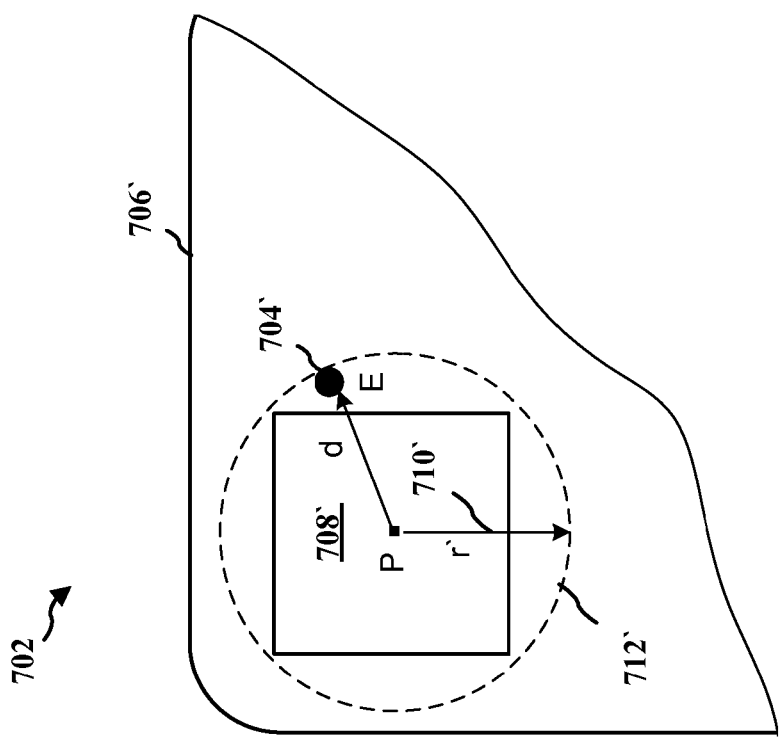
FIG. 7B is an illustration of a region of an HMD screen showing the GUI object of FIG. 7A adjusted so that the spatial relationship between the user-initiated location point (E) and the GUI object on the HMD is within range of the object to initiate interaction with the AR device.
Figure 7A:
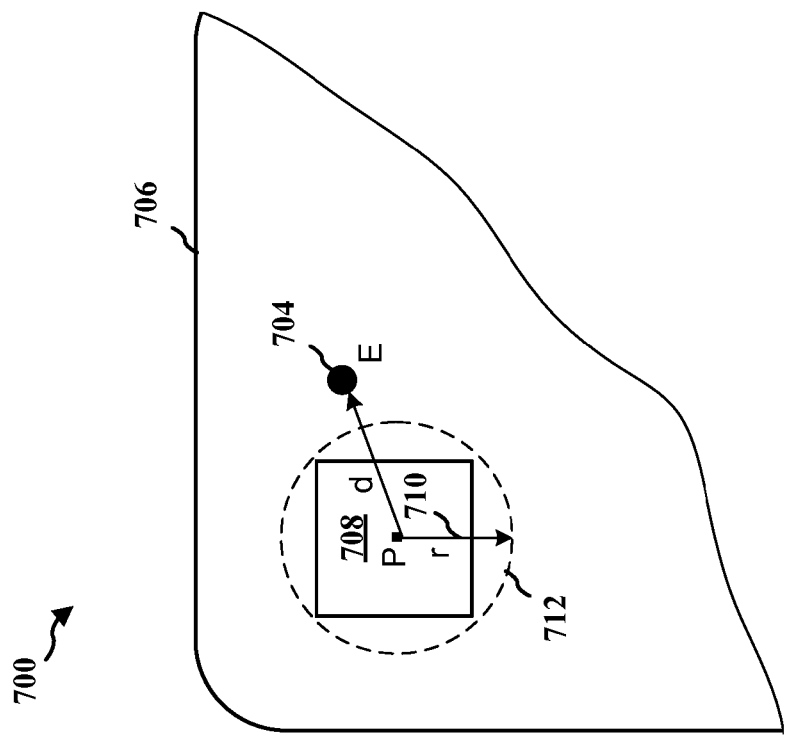
FIG. 7A is an illustration of a region of an HMD screen showing a spatial relationship between a user-initiated location point (E) and a GUI object on the HMD, wherein the location point is too distant from the object to initiate interaction with the AR device.

FIG. 7A is an illustration of a region 700 of an HMD screen showing a spatial relationship between a user-initiated location point (E) and a GUI object on the HMD, wherein the location point is too distant from the GUI object to initiate interaction with the AR device. An eye gaze object 704 corresponding to a location point (E) on the HMD 706 where a user is determined to be looking by an eye tracking module is displayed on the HMD. A GUI object or screen image 708 corresponding to, for example, an application icon is also displayed on the HMD 706. The GUI object 708 has an object point (P) that may be the center of the object. A threshold distance 710 is associated with the screen image, and may be defined, for example, by a radius (r) measured from the object point (P) and defining a circle bounding the screen image 708.

In the instance illustrated in FIG. 7A, the GUI adjustment module 322 determines that the eye gaze object (E) does not satisfies the criterion because the eye-gaze object 704 lies outside the boundary 712. Accordingly, the GUI adjustment module 322 adjusts the rendering of the GUI object.

FIG. 7B is an illustration of a region 702 of the HMD screen of FIG. 7A showing a spatial relationship between a user-initiated location point (E) and the GUI object on the HMD, after adjustment of the size parameter of the GUI object. An eye gaze object 704' corresponding to a location point (E) on the HMD 706' where a user is determined to be looking by an eye tracking module is displayed on the HMD. The GUI object or screen image 708' corresponding to, for example, an application icon is rendered larger in size and is also displayed on the HMD 706'. The GUI object 708' has an object point (P) that may be the center of the object. A threshold distance 710' is associated with the screen image, and may be defined, for example, by a radius (r') measured from the object point (P) and defining a circle bounding the screen image 708'. In the instance illustrated in FIG. 7B, the GUI adjustment module 322 determines that the eye gaze object (E) satisfies the criterion because the eye-gaze object 704' lies on or within the boundary 712'. Accordingly, no further adjustment of the GUI object is needed.

As a result of the customized rendering of the GUI object, the object section module 316 determines the eye gaze object (E) is at or near the object point (P). Based on this, the AR device determines that a user interaction, e.g., icon selection, has occurred, and an appropriate action follows. For example, if the object point (P) represents an application icon, a command from the object section module 316 may open the application.

In some cases, the amount by which the screen image 708' and the boundary 712' is increased may be limited so as not to overlap or interfere with adjacent screen images. In instances where adjacent screen images or boundaries are too close to each other or begin to overlap, the user may be asked to initiate a recalibration of the eye tracking module 312. Furthermore, in cases where a location point (E) lies equidistant from two adjacent boundaries or lies within a region of overlapping boundaries, the object selection module 316 may determine which the GUI object or screen image 708' is selected based on additional criteria. For example, the object selection module 316 may consider the history of past selections by the user and select the GUI object or screen image 708' that has been selected more times in the past. In other examples, the object selection module 316 may select the GUI object or screen image 708' having the smaller sized boundary 712', or the screen image that is bigger. Otherwise described, the object selection module 316 may determine, when the location point (E) lies equidistant from two adjacent boundaries or lies within a region of overlapping boundaries, the GUI object or screen image 708' has been selected based on one or more of: the size of the respective boundaries (i.e., the size of the boundary 712' corresponding to the GUI object or screen image 708' and the other boundary corresponding to the other GUI object), the size of the respective GUI objects (i.e., the GUI object or screen image 708' and the other GUI object), and the number of times the respective GUI objects (i.e., the GUI object or screen image 708' and the other GUI object) have been selected in the past.

Figure 8:
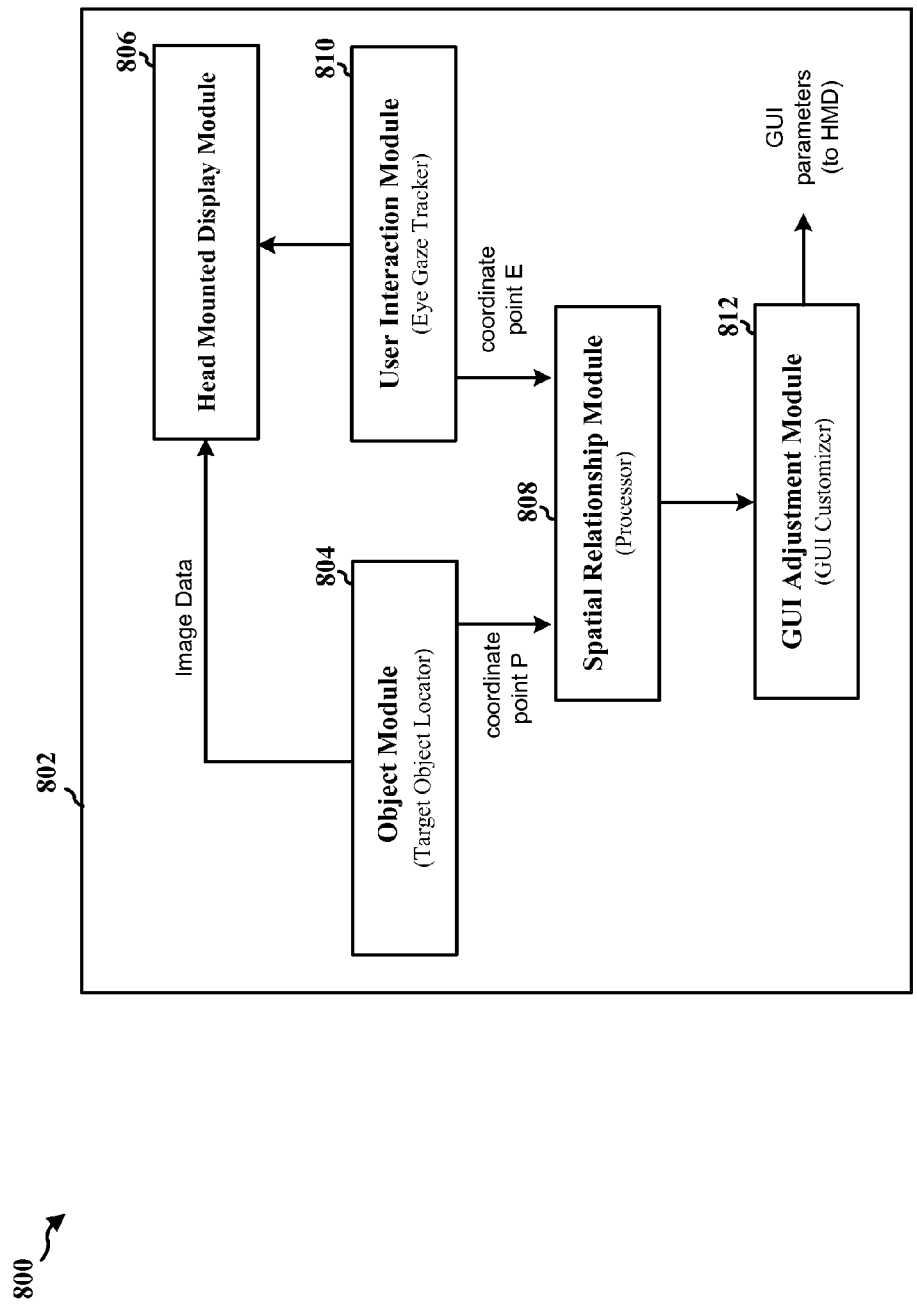
FIG. 8 is a diagram illustrating elements of an AR device that renders a GUI object on an optical see-through HMD.

FIG. 8 is a diagram 800 illustrating elements of an AR device 802 that provides automatic and customized rendering of a GUI on an optical see-through HMD. The AR device 802 includes an object module 804, a HMD module 806, a spatial relationship module 808, a user interaction module 810 and a GUI adjustment module 812. These modules may be referred to by different names, as indicated parenthetically, and may correspond to one or more of the modules of FIG. 3. For example, the object module 804 may be part of the object selection module 316, the spatial relationship module 808 may be part of the GUI adjustment module 322, and the user interaction module 810 may be the eye tracking module 312 or the gesture tracking module 314.

The object module 804 provides data corresponding to the position of a GUI object displayed on the HMD. The data may include image data that is provided to the HMD 806 in order to display the object 708 on the HMD. The data also includes coordinate data that defines the object point (P) of the GUI object 708 in terms of the coordinate system corresponding to the HMD screen. The coordinate data for the object point (P) is provided to the spatial relationship module 808.

The spatial relationship module 808 obtains a location on the HMD corresponding to a user interaction with the GUI object 708 displayed on the HMD. The location is obtained from the user interaction module 810. The user interaction may be an eye gaze, in which case the user interaction module 810 is an eye tracking module that tracks user eye gaze and outputs data corresponding to the location. The user interaction may be gesture, in which case the user interaction module 810 is a gesture tracking module that tracks user gestures and outputs data corresponding to the location. In either case, the location data includes coordinate data that defines the location point (E) of the user interaction in terms of the coordinate system corresponding to the HMD screen.

The spatial relationship module 808 determines whether a spatial relationship between the location and the GUI object satisfies a criterion and the GUI adjustment module 812 adjusts a parameter of the GUI object when the criterion is not satisfied. The determination of whether the criterion is satisfied is based on the coordinate data (P) of the GUI object and the coordinate data (E) of the user interaction. In one configuration, the coordinate data (P) of the GUI object may be used to define a boundary around the object, and the criterion is not satisfied when the distance is such that the location point lies outside the boundary.

The AR devices, as illustrated in FIGS. 3 and 8 may include additional modules that perform each of the steps of the algorithm in the aforementioned flow chart of FIG. 6. As such, each step in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
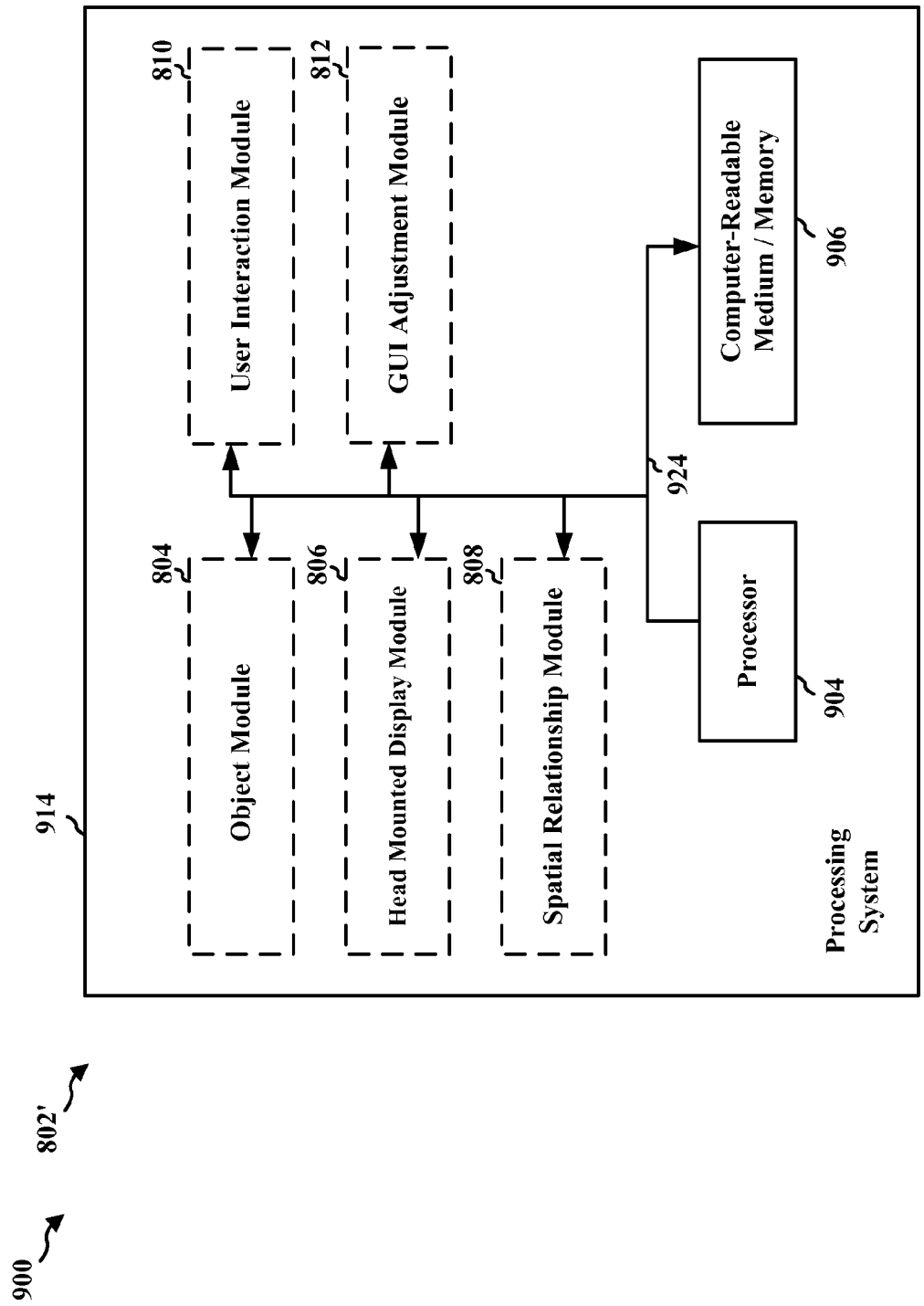
FIG. 9 is a diagram illustrating an example of a hardware implementation for an AR device employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810 and 812. The modules may be software modules running in the processor 904, resident/stored in the computer readable medium/memory 906, one or more hardware modules coupled to the processor 904, or some combination thereof.

In one configuration, the apparatus 802/802' includes means for obtaining a location on the HMD corresponding to a user interaction with a GUI object displayed on the HMD. The apparatus 802/802' also includes means for determining whether a spatial relationship between the location and the GUI object satisfies a criterion. The apparatus 802/802' further includes means for adjusting a parameter of the GUI object when the criterion is not satisfied. The aforementioned means may be one or more of the aforementioned modules of the apparatus 802 and/or the processing system 914 of the apparatus 802' configured to perform the functions recited by the aforementioned means.

Returning to FIG. 8, in summary, the AR device identifies a user interaction with the HMD, e.g., eye fixation, and measures the accuracy of the eye gaze relative to a target object. This may be done using known eye tracking technologies, including for example a backward facing camera on an AR device that captures the user's eye and an algorithm that tracks movement of the user's eye based on the image from the camera. The eye tracking technology provides an eye gaze coordinate (E) with respect to the HMD screen and the AR device displays the eye-gaze coordinate on the screen.

With reference to FIG. 7A, the offset between the eye-gaze coordinate (E) and a target coordinate (P) is distance d. The AR device specifies a bounding box around a target image or activation area (e.g. a GUI element such as an icon or a button), and determines if the eye-gaze coordinate (E) is inside the box. If an eye gaze is detected outside the bounding box, the AR device adjusts the rendering (e.g., size and/or location) of the GUI elements based on the accuracy. For example, if the known center of an icon is P, the bounding box takes P as the center of a circle, and r as radius. The bounding box could have other specifications. A distance d between the center P and the eye-gaze coordinate (E) is determined. The rendering, e.g., size, of the icon is adjusted when d>=r.

With reference to FIG. 7B, the effective size of the icon may be rendered larger by increasing the size of the bounding box 712', i.e., by increasing the radius r, that is used by the AR device to detect user interactions. This may be done without actually increasing the size of the icon displayed on the HMD. Alternatively, or in addition, the icon may also be rendered larger by increasing the size icon displayed on the HMD so that edges of the icon extend beyond an increased radius. The AR device thus provides a way for the users to seamlessly interact with the graphical user interface even when eye-gaze tracking is not accurate.

In an aspect of the disclosure, a method, an apparatus, and a computer program product provide for rendering of a graphical user interfaces (GUI) on a head mounted display. A method includes determining whether a user initiated object on the display is within a threshold distance of a GUI screen image displayed on the display, and adjusting a parameter of the screen image when the user initiated object is not within the threshold distance so that the user initiated object is subsequently within the threshold distance. Determining may include obtaining data corresponding to a first point of the screen image on the display, determining data corresponding to a boundary around the first point, obtaining data corresponding to a second point of the user initiated object on the display, and determining the user initiated object is within a threshold distance when the second point lies within the boundary. The first point may be the center of the screen image, and the boundary may be a circle having a radius from the center. The parameter of the screen image that is adjusted may include one or more of a size of the screen image, a size of a boundary associated with the screen image or a location of the screen image. The user initiated object may be an eye gaze object corresponding to eye gaze of the user. The user initiated object may be a gesture object corresponding to a gesture made by the user.

A corresponding apparatus for rendering graphical user interfaces (GUI) on a head mounted display includes means for determining whether a user initiated object on the display is within a threshold distance of a GUI screen image displayed on the display, and means for adjusting a parameter of the screen image when the user initiated object is not within the threshold distance so that the user initiated object is subsequently within the threshold distance. The means for determining whether a user initiated object on the display is within a threshold distance of a GUI screen image displayed on the display may be configured to obtain data corresponding to a first point of the screen image on the display, to determine data corresponding to a boundary around the first point, to obtain data corresponding to a second point of the user initiated object on the display, and to determine the user initiated object is within a threshold distance when the second point lies within the boundary.

Another corresponding apparatus for rendering graphical user interfaces (GUI) on a head mounted display includes a memory, and at least one processor coupled to the memory and configured to determine whether a user initiated object on the display is within a threshold distance of a GUI screen image displayed on the display, and to adjust a parameter of the screen image when the user initiated object is not within the threshold distance so that the user initiated object is subsequently within the threshold distance. In order to determine whether a user initiated object on the display is within a threshold distance of a GUI screen image displayed on the display, the processor is configured to obtain data corresponding to a first point of the screen image on the display, to determine data corresponding to a boundary around the first point, to obtain data corresponding to a second point of the user initiated object on the display, and to determine the user initiated object is within a threshold distance when the second point lies within the boundary.

A computer program product for rendering graphical user interfaces (GUI) on a head mounted display includes a computer-readable medium comprising code for determining whether a user initiated object on the display is within a threshold distance of a GUI screen image displayed on the display, and code for adjusting a parameter of the screen image when the user initiated object is not within the threshold distance so that the user initiated object is subsequently within the threshold distance. The code for determining whether a user initiated object on the display is within a threshold distance of a GUI screen image displayed on the display includes code for obtaining data corresponding to a first point of the screen image on the display, code for determining data corresponding to a boundary around the first point, code for obtaining data corresponding to a second point of the user initiated object on the display, and code for determining the user initiated object is within a threshold distance when the second point lies within the boundary.

In another aspect of the disclosure, a method, an apparatus, and a computer program product provide for rendering graphical user interfaces (GUI) on a head mounted display. A method includes determining an offset between a real eye gaze coordinate and a target spot coordinate first, through for example user looking at an eye gaze calibration point, and applying the offset to a parameter of the rendering of the screen image if the offset is not greater than the maximum screen image size (threshold) so that the user initiated object is subsequently within the threshold distance.

A corresponding apparatus for rendering graphical user interfaces (GUI) on a head mounted display includes means for determining an offset between a real eye gaze coordinate and a target spot coordinate first, through for example user looking at an eye gaze calibration point, and means for applying the offset to a parameter of the rendering of the screen image if the offset is not greater than the maximum screen image size (threshold) so that the user initiated object is subsequently within the threshold distance.

Another apparatus for rendering graphical user interfaces (GUI) on a head mounted display includes a memory, and at least one processor coupled to the memory and configured to determine an offset between a real eye gaze coordinate and a target spot coordinate first, through for example user looking at an eye gaze calibration point, and to apply the offset to a parameter of the rendering of the screen image if the offset is not greater than the maximum screen image size (threshold) so that the user initiated object is subsequently within the threshold distance.

A computer program product for rendering graphical user interfaces (GUI) on a head mounted display includes a computer-readable medium comprising code for determining an offset between a real eye gaze coordinate and a target spot coordinate first, through for example user looking at an eye gaze calibration point, and code for applying the offset to a parameter of the rendering of the screen image if the offset is not greater than the maximum screen image size (threshold) so that the user initiated object is subsequently within the threshold distance.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method comprising:
    obtaining a first location corresponding to a user interaction with a display, wherein the first location is in a screen coordinate system of the display;
    determining a first distance between the first location and a graphical user interface (GUI) object presented on the display;
    comparing the first distance to a threshold distance;
    initially adjusting a parameter of the GUI object as a result of the comparison, wherein initially adjusting the parameter comprises: initially increasing the parameter of the GUI object when the first distance is greater than the threshold distance, and initially decreasing the parameter of the GUI object when the first distance is less than the threshold distance, wherein the parameter is unadjusted prior to adjustment; and
    rendering the GUI object with the adjusted parameter for presentment on the display.

2. The method of claim 1, wherein the user interaction includes an eye gaze.

3. The method of claim 1, wherein the user interaction includes a gesture.

4. The method of claim 1, wherein determining the distance between the first location and the GUI object comprises:
    determining the distance between the first location and a second location corresponding to the GUI object, wherein the second location is in the screen coordinate system of the display.

5. The method of claim 1, wherein determining the distance between the first location and the GUI object comprises:
    determining the distance between the first location and a boundary associated with the GUI object.

6. The method of claim 5, wherein the boundary is defined by a geometric shape relative to the GUI object.

7. The method of claim 6, wherein the GUI object has a center, and wherein the geometric shape is defined relative to the center of the GUI object.

8. The method of claim 7, wherein the boundary has a center, wherein the center of the boundary corresponds to a second location in the screen coordinate system of the display, wherein a third location in the screen coordinate system of the display corresponds to the GUI object, and wherein the second location and the third location are the same.

9. The method of claim 8, wherein the GUI object has a center and the second location corresponds to the center of the GUI object.

10. The method of claim 5, wherein the first distance is greater than the threshold distance when the first location lies outside the boundary.

11. The method of claim 5, wherein the first distance is less than the threshold distance when the first location lies inside the boundary.

12. The method of claim 5, wherein the boundary is a circle having a radius measured from a second location corresponding to the GUI object, wherein the second location is in the screen coordinate system of the display, and wherein the radius is a value such that the GUI object is within the boundary.

13. The method of claim 12, wherein the first distance is greater than the threshold distance when the first location lies outside the boundary.

14. The method of claim 12, wherein the first distance is less than the threshold distance when the first location lies inside the boundary.

15. The method of claim 12, wherein the GUI object has a center and the second location corresponds to the center of the GUI object.

16. The method of claim 1, wherein the parameter comprises one or more of: a size of the GUI object or a size of a boundary associated with the GUI object.

17. The method of claim 1, wherein the GUI object is a first GUI object of a plurality of GUI objects presented on the display, wherein a respective boundary corresponds to each respective GUI object of the plurality of GUI objects, and wherein the method further comprises:
    determining that the first GUI object has been selected when the first location is closest to the boundary associated with the first GUI object.

18. The method of claim 1, wherein the GUI object is a first GUI object of a plurality of GUI objects presented on the display, wherein the plurality of GUI object includes a second GUI object, wherein a first boundary corresponds to the first GUI object and a second boundary corresponds to the second GUI object, and wherein the method further comprises:
    determining, when the first location is equidistant from the first boundary and the second boundary, that the first GUI object has been selected based on one or more of:
    the size of the first boundary and the size of the second boundary,
    the size of the first GUI object and the size of the second GUI object, or
    a number of times the first GUI object has been selected in the past and a number of times the second GUI object has been selected in the past.

19. The method of claim 1, wherein a device includes the display.

20. The method of claim 19, wherein the device with the display is a head mounted display (HMD).

21. The method of claim 1, wherein a second location in the screen coordinate system of the display corresponds to the GUI object, and wherein the GUI object has a center and the second location corresponds to the center of the GUI object.

22. The method of claim 1, wherein initially increasing the parameter of the GUI object comprises:
    initially increasing the parameter proportionally to the first distance.

23. The method of claim 1, wherein initially decreasing the parameter of the GUI object comprises:
    initially decreasing the parameter proportionally to the first distance.

24. An apparatus comprising:
    means for obtaining a first location corresponding to a user interaction with a display, wherein the first location is in a screen coordinate system of the display;
    means for determining a distance between the first location and a graphical user interface (GUI) object presented on the display;
    means for comparing the first distance to a threshold distance;
    means for initially adjusting a parameter of the GUI object as a result of the comparison, wherein the means for initially adjusting the parameter is configured to: initially increase the parameter of the GUI object when the first distance is greater than the threshold distance, and initially decrease the parameter of the GUI object when the first distance is less than the threshold distance, wherein the parameter is unadjusted prior to adjustment; and means for rendering the GUI object with the adjusted parameter for presentment on the display.

25. The apparatus of claim 24, wherein the user interaction includes an eye gaze.

26. The apparatus of claim 24, wherein the user interaction includes a gesture.

27. The apparatus of claim 24, wherein the means for determining the distance between the first location and the GUI object is configured to:

determine the distance between the first location and a second location corresponding to the GUI object, wherein the second location is in the screen coordinate system of the display.

28. The apparatus of claim 24, wherein the means for determining the distance between the first location and the GUI object is configured to:

determine the distance between the first location and a boundary associated with the GUI object.

29. The apparatus of claim 28, wherein the boundary is defined by a geometric shape relative to the GUI object.

30. The apparatus of claim 29, wherein the GUI object has a center, and wherein the geometric shape is defined relative to the center of the GUI object.

31. The apparatus of claim 28, wherein the first distance is greater than the threshold distance when the first location lies outside the boundary.

32. The apparatus of claim 24, wherein the parameter comprises one or more of: a size of the GUI object or a size of a boundary associated with the GUI object.

33. The apparatus of claim 24, wherein the GUI object is a first GUI object of a plurality of GUI objects presented on the display, wherein a respective boundary corresponds to each respective GUI object of the plurality of GUI objects, and wherein the apparatus further comprises:

means for determining that the first GUI object has been selected when the first location is closest to the boundary associated with the first GUI object.

34. The apparatus of claim 24, wherein the GUI object is a first GUI object of a plurality of GUI objects presented on the display, wherein the plurality of GUI object includes a second GUI object, wherein a first boundary corresponds to the first GUI object and a second boundary corresponds to the second GUI object, and wherein the apparatus further comprises:

means for determining, when the first location is equidistant from the first boundary and the second boundary, that the first GUI object has been selected based on one or more of:

the size of the first boundary and the size of the second boundary, the size of the first GUI object and the size of the second GUI object, or a number of times the first GUI object has been selected in the past and a number of times the second GUI object has been selected in the past.

35. The apparatus of claim 24, wherein the apparatus is a head mounted apparatus.

36. The apparatus of claim 35, wherein the apparatus with the display is a head mounted display (HMD).

37. An apparatus comprising:

a memory;

a display; and at least one processor coupled to the memory, wherein the at least one processor is configured to:

obtain a first location corresponding to a user interaction with the display, wherein the first location is in a screen coordinate system of the display;

determine a distance between the first location and a graphical user interface (GUI) object presented on the display;

compare the first distance to a threshold distance;

initially adjust a parameter of the GUI object as a result of the comparison, wherein to initially adjust the parameter, the at least one processor is configured to:

initially increase the parameter of the GUI object when the first distance is greater than the threshold distance, and initially decrease the parameter of the GUI object when the first distance is less than the threshold distance, wherein the parameter is unadjusted prior to adjustment; and render the GUI object with the adjusted parameter for presentment on the display.

38. The apparatus of claim 37, wherein the user interaction includes an eye gaze.

39. The apparatus of claim 37, wherein the user interaction includes a gesture.

40. The apparatus of claim 37, wherein to determine the distance between the first location and the GUI object, the at least one processor is configured to:

determine the distance between the first location and a second location corresponding to the GUI object, wherein the second location is in the screen coordinate system of the display.

41. The apparatus of claim 40, wherein to determine the distance between the first location and the GUI object, the at least one processor is configured to:

determine the distance between the first location and a boundary associated with the GUI object.

42. The apparatus of claim 41, wherein the first distance is less than the threshold distance when the first location lies inside the boundary.

43. The apparatus of claim 41, wherein the boundary is a circle having a radius measured from a second location corresponding to the GUI object, wherein the second location is in the screen coordinate system of the display, and wherein the radius is a value such that the GUI object is within the boundary.

44. The apparatus of claim 43, wherein the first distance is greater than the threshold distance when the first location lies outside the boundary.

45. The apparatus of claim 43, wherein the first distance is less than the threshold distance when the first location lies inside the boundary.

46. The apparatus of claim 43, wherein the GUI object has a center and the second location corresponds to the center of the GUI object.

47. The apparatus of claim 41, wherein the boundary is defined by a geometric shape relative to the GUI object, wherein the GUI object has a center, and wherein the geometric shape is defined relative to the center of the GUI object.

48. The apparatus of claim 47, wherein the boundary has a center, wherein the center of the boundary corresponds to a second location in the screen coordinate system of the display, wherein a third location in the screen coordinate system of the display corresponds to the GUI object, and wherein the second location and the third location are the same.

49. The apparatus of claim 48, wherein the GUI object has a center and the second location corresponds to the center of the GUI object.

50. The apparatus of claim 37, wherein the apparatus is a head mounted apparatus.

51. The apparatus of claim 50, wherein the apparatus with the display is a head mounted display (HMD).

52. The apparatus of claim 37, wherein a second location in the screen coordinate system of the display corresponds to the GUI object, and wherein the GUI object has a center and the second location corresponds to the center of the GUI object.

53. The apparatus of claim 37, wherein to initially increase the parameter of the GUI object, the at least one processor is configured to:

initially increase the parameter proportionally to the first distance.

54. The apparatus of claim 37, wherein to initially decrease the parameter of the GUI object, the at least one processor is configured to:

initially decrease the parameter proportionally to the first distance.

55. A non-transitory computer-readable medium having instructions stored thereon that, when executed, cause at least one processor of a device to:

obtain a first location corresponding to a user interaction with a display, wherein the first location is in a screen coordinate system of the display;

determine a distance between the first location and a graphical user interface (GUI) object presented;

compare the first distance to a threshold distance;

initially adjust a parameter of the GUI object as a result of the comparison, wherein the instructions, when executed, cause the at least one processor to: initially increase the parameter of the GUI object when the first distance is greater than the threshold distance, and initially decrease the parameter of the GUI object when the first distance is less than the threshold distance, wherein the parameter is unadjusted prior to adjustment; and render the GUI object with the adjusted parameter for presentment on the display.

* * * * *